United States Patent [19]

Kohl et al.

[11] Patent Number: 5,198,744
[45] Date of Patent: Mar. 30, 1993

[54] APPARATUS AND METHOD FOR CONTROLLING THE OUTPUT POWER OF A GENERATOR TO MAINTAIN GENERATOR TEMPERATURE BELOW AN ALLOWED LIMITING VALUE

[75] Inventors: Walter Kohl, Bietigheim; Friedhelm Meyer, Illingen; Rainer Mittag, Kornwestheim; Guenter Schramm, Vaihingen-Enzweihingen, all of Fed. Rep. of Germany

[73] Assignee: Robert Bosch GmbH, Stuttgart, Fed. Rep. of Germany

[21] Appl. No.: 712,132

[22] Filed: Jun. 6, 1991

[30] Foreign Application Priority Data

Jun. 21, 1990 [DE] Fed. Rep. of Germany ....... 4019751
Jan. 26, 1991 [DE] Fed. Rep. of Germany ....... 4102335

[51] Int. Cl.$^5$ .............................................. H02J 7/14
[52] U.S. Cl. .................................................. 322/33
[58] Field of Search ....................... 322/33, 34, 11, 22, 322/99; 320/35, 64, 48

[56] References Cited

U.S. PATENT DOCUMENTS 4,470,003 9/1984 Mitchell ............................ 322/33 X
4,563,631 1/1986 Mashino et al. ...................... 322/33
4,659,977 4/1987 Kissel et al. ............................ 322/33

FOREIGN PATENT DOCUMENTS 3142878 10/1981 Fed. Rep. of Germany .

Primary Examiner—Steven L. Stephan
Assistant Examiner—Ed To
Attorney, Agent, or Firm—Michael J. Striker

[57] ABSTRACT

A generator having an exciting winding and a standard load associated with a standard exciting current in the exciting winding can be controlled by a voltage regulator which adjusts an exciting current in the exciting winding and a temperature measurement device in a predetermined location in the generator and/or a voltage regulator associated with the generator, which is connected to the voltage regulator, advantageously via a microprocessor device or a pulse duration modulation circuit connected to the final regulating stage of the voltage regulator for gating the exciting current. So that the generator can be dimensioned to operate above its maximum rated temperature and can be operated in a superexcited state, the method of controlling the generator includes the steps of increasing the exciting current in the exciting winding beyond the standard exciting current to operate the generator at a higher load than the standard load; measuring a temperature $T_G$ at a predetermined location, advantageously in the generator, with the temperature measurement device; determining an allowed limiting temperature $T_{GMAX}$ at the predetermined location; lowering the exciting current, $I_{Err}$, when the temperature $T_G$ is greater than the allowed limiting temperature $T_{GMAX}$ and maintaining the output power as high as possible without exceeding the allowed limiting temperature.

19 Claims, 3 Drawing Sheets

APPARATUS AND METHOD FOR CONTROLLING THE OUTPUT POWER OF A GENERATOR TO MAINTAIN GENERATOR TEMPERATURE BELOW AN ALLOWED LIMITING VALUE

BACKGROUND OF THE INVENTION

The present invention relates to an apparatus and method for controlling the output power of a generator and particularly to an apparatus and method for keeping the generator temperature below an allowed limiting value.

An apparatus for control of generator output power is known including an exciting winding of a generator, a voltage regulator connected with the generator, which controls the output power of the generator by influencing the excitation current in the exciting winding of the generator and means for temperature measurement.

An A.C. alternator, which produces an alternating voltage, is predominantly currently used in motor vehicles to supply electrical power. The alternating voltage produced by the alternator is rectified in a connected rectifying device for supplying direct-current consuming devices and for charging a battery. Since the output voltage of the generator depends considerably on the generator speed, a voltage regulator is used to provide the desired constant output voltage, which influences the excitation current of the generator, so that the generator voltage is held at a constant value, which in the typical motor vehicle power supply system is 14 volts D.C., despite considerable changes in the generator speed.

Since the number of electrical energy-consuming devices in motor vehicles is continually growing, the requirements for generators are always increasing. Particularly in winter, when window heaters are turned on in addition to the standard consuming devices or when the motor vehicle spends a longer time in city traffic, and also when the generator is operated at a slower rotation speed, energy supply problems develop. For this reason the current generated by the A.C. alternator has been increased, so that the power output of the generator is greater at the same voltage.

One possibility, which increases generator power, is described in German Published patent Application 31 42 878. According to this suggestion, the exciting winding is provided with a voltage increased relative to the battery voltage. Because of that the strength of the exciting current is increased, since a substantially greater magnetic field is produced, which leads to an increase of generator output power with generator dimensions otherwise unchanged. The maximum exciting current and/or the maximum flow is determined by the limiting temperature of the rectifier diodes and/or the stators in the generator. If, as described in German Published Patent Document 31 42 878, the exciting winding operates with a comparatively greater voltage relative to the power supply voltage, there is a danger that the temperature limit may be exceeded during harmful or damaging operating conditions.

SUMMARY OF THE INVENTION

To solve these problems, it has been suggested in unpublished German Patent Document DE-P 38 43 163, to increase the excitation current relative to the standard control current in the A.C.alternator under certain conditions to optimize the power consumption of the power generated in the power supply. By providing a temperature measuring device in the controller and arranging the controller in a generator component which is particularly susceptible to temperature increases due to heating, the temperature limit can be correctly ascertained. This knowledge can be used to reduce the exciting current, so that the temperature limit is not exceeded. In German Unpublished Patent Document DE-P 38 43 163 how the increase of the exciting current over the nominal regulating current is to occur is not explained.

According to the present invention, a generator is provided having means for measuring temperature $T_G$ at predetermined locations in the vicinity of the voltage regulator and/or generator and means for determining an allowed temperature limit or limits, $T_{GMAX}$ at various locations in the apparatus and means for changing the exciting current, $I_{Err}$, of its exciting winding. Similarly a new method of operating a generator, especially a generator used in a motor vehicle, is provided comprising measuring the temperature $T_G$ of the generator, comparing a temperature or temperatures of the generator to a predetermined temperature limit or limits $T_{GMAX}$ the exciting current, $I_{Err}$, in the exciting winding when the temperature limit is or limits are reached or exceeded. This method is particularly useful at low generator rotation speeds during high load and/or high exterior or surrounding temperature.

The apparatus and method for controlling a generator according to the invention have the advantage that, in contrast to the known methods and devices, with high power demand the generator can be operated in a super-excited region, and/or above the rated temperature limit. These features and methods prevent the generator, the rectifier diodes or the voltage controller from being destroyed, because of overheating.

It is thus possible to temporarily operate the generator in the super-excited region without any problems using an exciting voltage, which is higher than the voltage in the power supply or by reducing the resistance of the exciting winding.

In an additional embodiment of the invention, it is possible to provide an apparatus for controlling a generator with a safety device, which reduces the exciting current in the exciting winding at a certain limiting temperature or shortly before that temperature, under conditions of operation at the standard controller current, involving, for example, a high surrounding temperature, in combination with a reduced cooling because of the heat, so that, in this case, a thermal overload is avoided.

The required determination of temperature can occur by temperature measurement in the voltage regulator and by calculating the temperature of an individual element of the apparatus. It is particularly advantageous to use performance graphs or to calculate generator, controller or vehicle typical parameters. Advantageously, a computer means may be used to calculate the temperatures at other locations in the apparatus from generator, regulator and/or vehicle parameters and the measured temperature in the voltage regulator.

This procedure of the invention corresponds to that generally known in control engineering, in which an observer determines an easily measured accessible parameter so that, from that measured value, another difficult-to-measure inaccessible parameter can be determined.

If the temperature at the voltage regulator is the measured value determined by the observer, the temperatures at other locations of the power supply similarly may be calculated, so that on exceeding one or more of the predetermined temperature limits, the exciting current is reduced in a further embodiment of the present invention.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
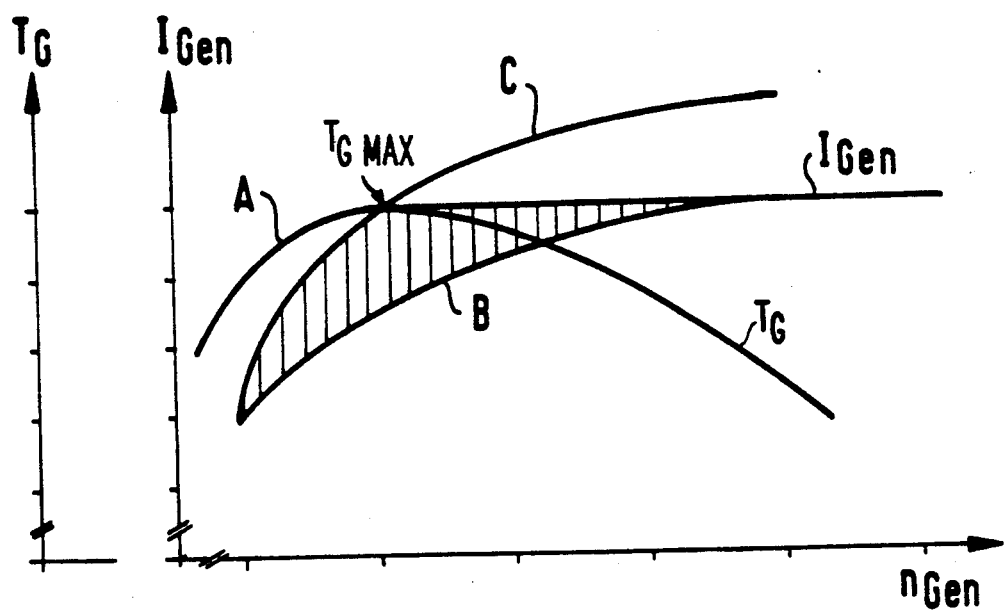
FIG. 1 is a graphical illustration of the dependence of the generator temperature and/or generator current on the rotation speed for two different exciting windings.

Curve A in FIG. 1 shows the dependence of the generator temperature $T_G$ on the generator rotation speed. The maximum occurring temperature is dependent on the rotation speed, the generator load and the surrounding temperature. The highest temperature occurs usually at relatively reduced rotation speed or number of revolutions of the generator, since the cooling power increases at higher rotation speed.

Usually the generator is so designed that also during operating conditions which could cause generator damage a maximum allowed temperature $T_{GMAX}$ is not exceeded. It is thus required that the exciting winding has a resistance which is so high that an exciting current flows in the adjacent power supply, which guarantees, that the thermal limit of the generator is not exceeded, usually is about 2.6.

Curve B shows the dependence of the generator current, $I_{Gen}$, on the rotation speed, n, for an exciting winding, whose resistance is adjusted so that the maximum allowed generator temperature is not exceeded.

Curve C shows the dependence of the generator current on the generator speed for an exciting winding, whose resistance is smaller than in B, and, e.g., amounts to 2.0. Using an exciting current with this sort of resistance the generator temperature take too high a value during operating conditions which could cause damage. Suitable features are provided in the apparatus and method of controlling a generator in our invention so that this is avoided.

If an exciting winding is used with reduced resistance, the current through this exciting winding must then be limited or controlled, when the danger that the temperature limit of the generator is exceeded is present, i.e. when the measured temperature approaches this value. Particularly at low outside or surrounding temperatures, the temperature limit, $T_{GMAX}$ or the power limit, can be exceeded without the features described here. The additional generator current is shown by the shaded region on FIG. 1.

Figure 2:
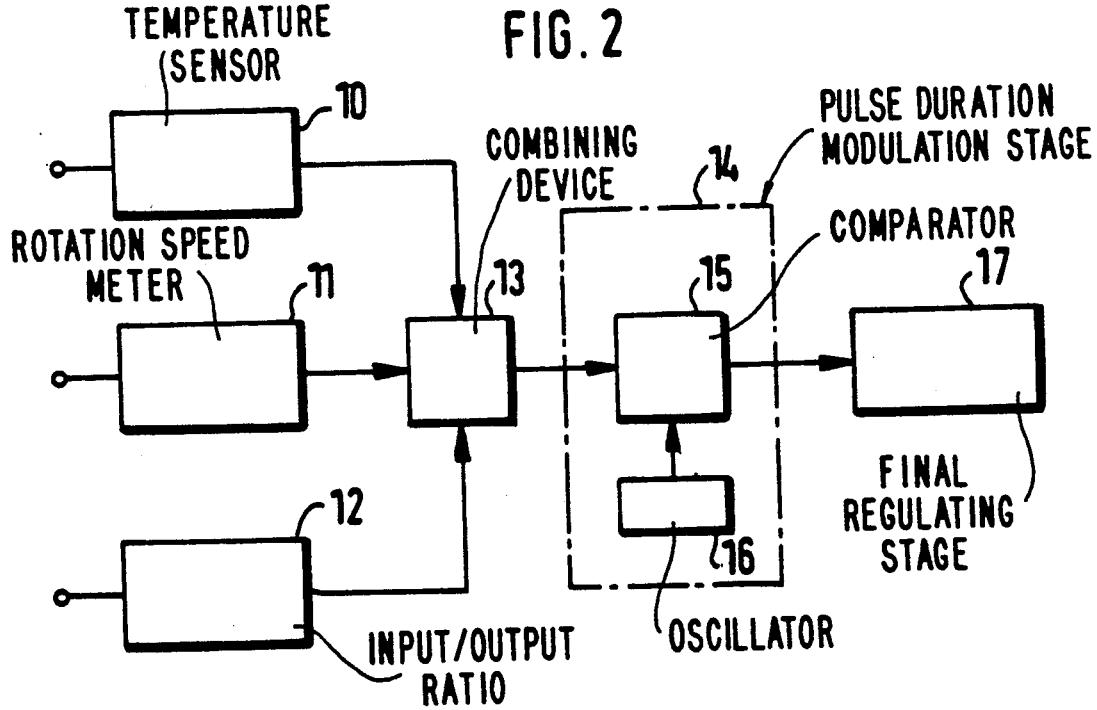
FIG. 2 is a block diagram of an apparatus for controlling a generator according to the invention which guarantees that the exciting current is reduced on attaining the limiting temperature.

In FIG. 2 an apparatus for controlling a generator is shown, with which the excitation current can be changed. A temperature sensor 10 is provided for measurement of the controller- and/or generator temperature. The temperature of the controller is measured with a temperature sensor 10. The temperature determination can occur in the regulator itself, since the regulator temperature cannot be changed by the self-heating under stable conditions. The regulator temperature is besides a measure of the outside temperature. A device 11 for measurement of the generator rotation speed is shown and another device 12 for determining the input/output ratio of the voltage regulator is also shown. This key input/output ratio is measured at the regulating terminal DF (see FIG. 5).

A combining device 13 combines the signals from the temperature sensor 10, from the device 11 for determining the rotation speed and from the device 12 for determining the input/output ratio. The generator rotation speed and the input/output ratio of the final regulating stage may be determined from the suitable graphical illustrations. The combined signal so obtained is fed to a pulse duration modulation stage 14, which comprises a comparator 15 and an oscillator 16. A modulated signal is produced in the pulse duration modulation stage 14. This modulated signal is fed to the final regulating stage 17 and the input/output ratio of the final regulating stage and thus the exciting current $I_{Err}$ is thus determined.

It is essential that with the device shown in FIG. 2 the regulator acts only above a predetermined critical temperature, only when the combined signal fed to the comparator 15 exceeds a certain predetermined threshold value. If the critical temperature is attained, the final regulating stage 17 receives the modulated signal produced in the pulse duration modulation stage 14 so that an additional increase in temperature, because of an increased excitation current, is avoided, i.e. the excitation current, is reduced by effective gating of the final regulating stage.

Figure 3:
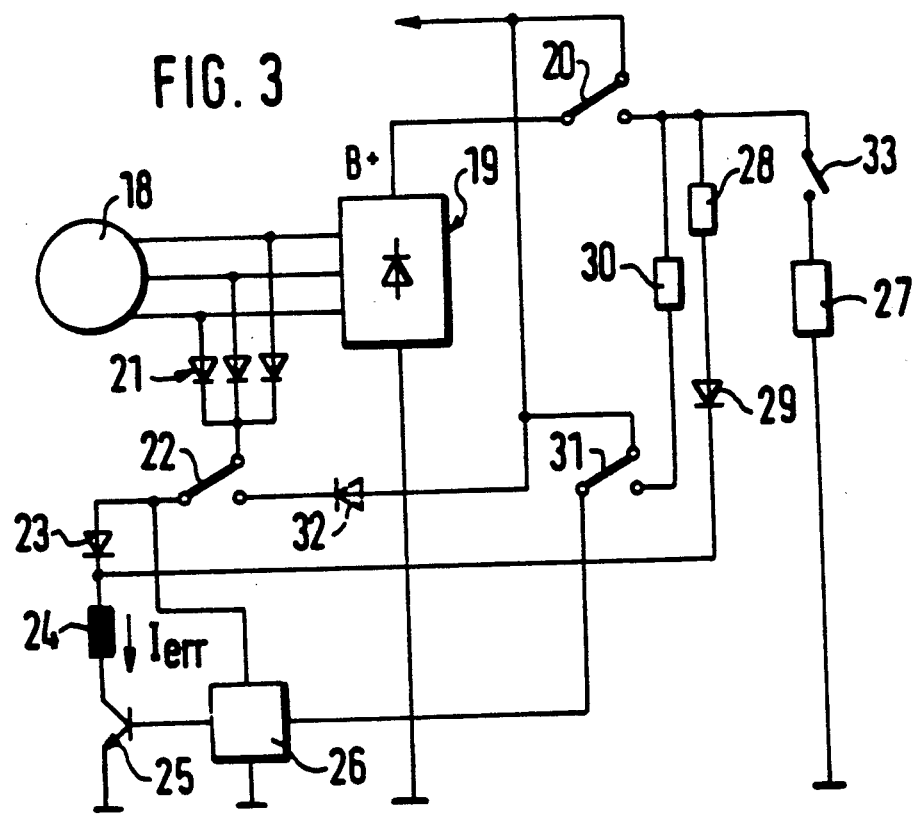
FIGS. 3 and 4 are two examples of circuit diagrams of circuits which provide the exciting winding with a voltage which is increased relative to the power supply voltage.

In the embodiment shown in FIG. 3, the increase of exciting current occurs, because a higher voltage is applied to the exciting winding at least during a predetermined time interval. This higher voltage is produced, because the generator, e.g. on operation of an electrical heating element, is operated with a free-running voltage. The higher voltage arising on operation with the free-running voltage at the generator terminal B+ is fed by a suitable circuit arrangement direction to the exciting winding.

The circuit shown in FIG. 3 includes the following: a generator 18, which is connected on one side with ground via the rectifier bridge 19 and on the other side with a conventional power supply with unshown consuming devices via the terminal B+ and a similarly unshown Battery. The connection between the terminal B+ and the consuming devices occurs by a switch 20.

The generator 18 is connected with the exciting winding 24 by an exciting rectifier 21 and an additional switch 22 as well as a diode 23. The exciting winding 24 is connected for its part with ground by the final stage transistor 25 of the voltage regulator 26. The voltage regulator 26 is also connected by switch 22 with the exciting rectifier 21.

An electrically heated window heating element 27 can be energized by the switch 20 at the terminal B+. An additional connecting line to the exciting winding 24 runs from the switch 20 to the exciting winding 24 and contains the resistor 2 and the diode 29. This connection can similarly be energized by the switch 20 and the terminal B+. An additional path for current from switch 20 includes the resistor 30 and another switch 31 and leads to the regulator 26. In the other state of the switch 31, which is shown in FIG. 3, the regulator 26 is connected with the power supply and by an additional diode 32 with the switch 22, the anode of the diode 32 being directly connected with the power supply.

In normal operation, when the usual power supply voltage of 12 v is applied to the exciting winding, the switch configuration is as shown in FIG. 3. The power supply is connected by the switch 20, the exciting current $I_{Err}$ of the exciting winding 24 is provided over the switch 22 and the voltage regulator 26 is connected by the switch 31 with the power supply. If in contrast these connections are reversed on increasing current, the terminal B+ is connected with the resistors 28 and 30 and with the heating element 27 by the switch 20. The regulator 26 is connected at the terminal B+ by the reversed switch 31, the exciting winding 24 is connected through the resistor 28 and the diode 29 to the terminal B+, the rectifier bridge 21 is separated from the exciting winding 24 by the switch 22.

With the switches in this configuration, the generator 18 operates with a free running voltage, thus a higher voltage than the power supply voltage arises at the terminal B+, this higher voltage being applied to the exciting winding 24 through the resistor 28 and the diode 29. Since the generator becomes too hot in this state, either the switches can be in this configuration for only the very short time of a few minutes or a circuit arrangement similar to that described in FIG. 2 must be used to limit the exciting current in the exciting winding, when the temperature of the regulator and/or the generator is too high. A timed switch member and/or the switch device for limiting the exciting current is thus advantageously contained in the voltage regulator 26.

The increasing current conditions usually occur during the heating phase of the window heating element. The additional switch 33 however can be used to disconnect the heating element 27, so that the power can increase with free-running voltage, without the heating element 27 being connected.

The diode 32 can be eliminated at its shown location, when the entire supply component is designed for high voltage, e.g. 20 volts. This can be mounted outside of the generator.

Figure 4:
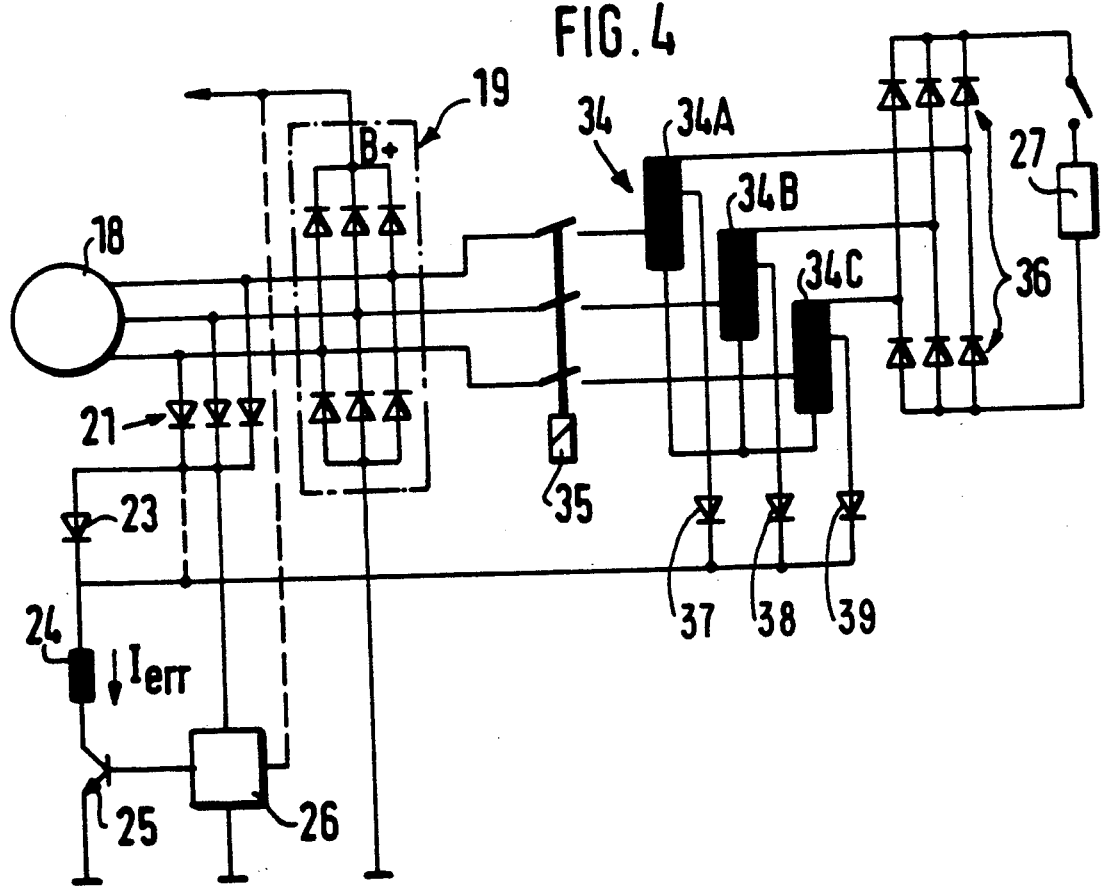

FIG. 4 shows another embodiment, in which the increased exciting current is attained by application of a higher voltage than the power supply voltage to the exciting winding 24. In this case, the higher voltage is maintained with the help of a transformer. Such an effort is profitable chiefly, when an increased voltage relative to the power supply voltage is required for an electrical heating element of the heated window.

In particular FIG. 4 shows a generator 18, which is connected with the terminal B+ with the power supply by a rectifier bridge 19, the other side of the rectifier bridge 19 being connected with ground. The exciting winding 24 is connected with the final regulating stage 25 by exciting diode 21 and a diode 23. The final regulating stage 25 is again connected with ground and with the regulator 26, the regulator 26 additional being connected to the exciting diodes 21.

The windings of the transformer 34 are connectable to the generator 18 by a relay 35. These transformer windings 34A, 34B and 34C are connected with the window heating element 27 via an additional rectifier system 36. Additional taps from the transformer windings 34A, 34B and 34C lead directly to the exciting winding 24 via the diodes 37, 38 and 39. In normal operation, the contacts of the relay are open and the exciting coil is operated with the voltage usually supplied by the generator.

If, for example in operation of the heating element of the window, an increasing power is demanded of the generator, a higher voltage, which provides the needed energy for the window element, is produced on pulling up relay 35 in transformer 34, which can also be replaced by a suitable voltage transformer. Simultaneously a voltage which is larger than the power supply voltage is applied to the exciting winding 24 by the diodes 37, 38 and 39, so that the current through the exciting winding 24 takes an increased value relative to the nominal regulator current. Since in this case there is a danger of thermal overload, it must be provided that the relay only remains in the pulled up state for a predetermined short time of a few minutes. It can however also be provided with a circuit device as in FIG. 2, which for example is contained in the voltage regulator 26, so that the exciting current $I_{Err}$ is reduced by a change in the key ratio of the voltage regulator despite of a higher voltage on attaining a critical temperature. A thermal overload of the regulator and/or the generator is thus avoided.

The relay 35 can contain a timing circuit, which opens a contact after a predetermined time. However it can also be controlled by the voltage regulator 26, by a connection shown in dashed lines in FIG. 4. The contact is opened, when the temperature measured in the regulator 26 climbs above a certain limiting value.

When the heating element 27 can be decoupled by another switch 33 from the transformer 34, a power output increase of the generator is possible without simultaneous heater operation.

If a voltage regulator 26 is used with a battery sensor and the battery voltage is supplied to the regulator by the conductors shown with dot-dashed lines in FIG. 4, the diode 23 can be eliminated and the exciting winding 24 is connected by the dot-dashed connected with the exciting diode 21.

A generator/voltage regulator arrangement, in which an increase of the exciting current, $I_{Err}$, over the nominal regulating current is not provided and which is still improved relative to the conventional system, can be obtained when a conventional arrangement, whose individual elements are structured so that an overheating could be tolerated under unsatisfactory conditions, is used.

To prevent this the exciting current $I_{Err}$ is lowered, when the voltage regulator detects that the temperature at a location in the system where the temperature increases.

Figure 5:
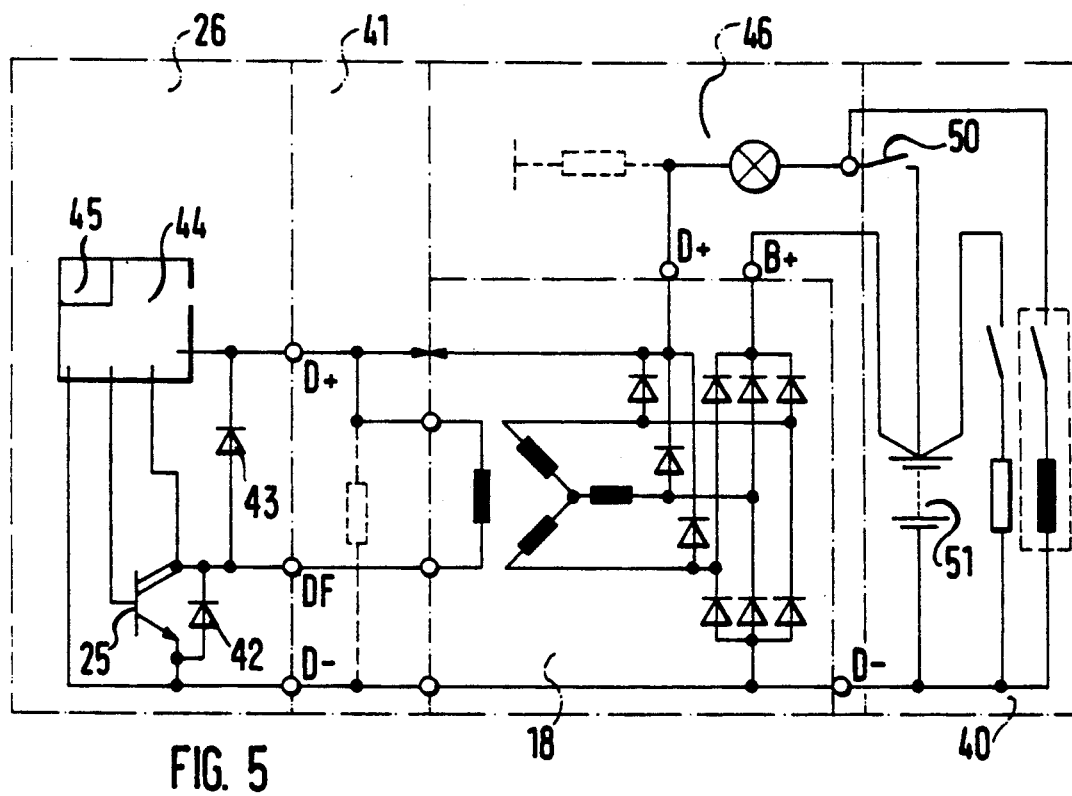
FIG. 5 is a circuit diagram of a generator voltage controller according to the present invention, which is designed so that under damage-causing conditions too high a temperature cannot occur and operation at increased exciting current is not provided.

In FIG. 5 a generator/voltage regulator arrangement of the type mentioned in two paragraphs immediately preceding is shown. An A.C. alternator, which is supplied with energy from a power supply 40. The regulation of the generator output occurs with a voltage regulator 26, which is connected with the A.C. alternator 18 by the brush holder 41. The generator 18, with the terminals D+, DF and D−, the power supply 40 and the brush holder 41 are constructed in the standard way and need not be described in detail, However the charge control lamp 46, the starter 50 and the battery 51, which is connected between the generator and the ground, should still be mentioned.

The voltage regulator 26 with the output terminals D+, DF and D− contains in a standard way a switching element, for example a switching transistor 25 with a parallel-connected diode 42, which is connected between the regulator terminals DF and D− and a free-running diode 43, which is connected between the terminals DF and D+.

The voltage regulator contains an incompletely illustrated circuit 44, which is connected between the terminals D+, DF and D− and to the base of transistor 25 as well as its collector.

The circuit 44 contains a temperature measuring circuit 45, which measures the temperature of the voltage regulator 26, the circuit 44 also includes an additional device, e.g. for error signally, which can as necessary also occur by the charge control lamp.

In case the battery temperature is measured, this information can similarly be fed to the circuit 44 along with generator rotation speed and other measured data.

The circuit 44 of the voltage regulator 26 can be constructed also as a microprocessor or microcomputer. Then in this microprocessor the necessary computations and/or actual value/set value comparison can be made considering the measured parameters such as control temperature and also the stored variables in the microprocessor.

The following characteristic parameters are stored in the computer: Characteristic parameters of the generator, of the voltage regulator, of the vehicle and the built-in characteristic values. Also limiting temperatures, $T_{GMAX}$, indicating the maximum allowed heating are stored in the microprocessor as well. These limiting temperatures could be the same for the entire system or there could be different limiting temperatures for different locations.

Figure 6:
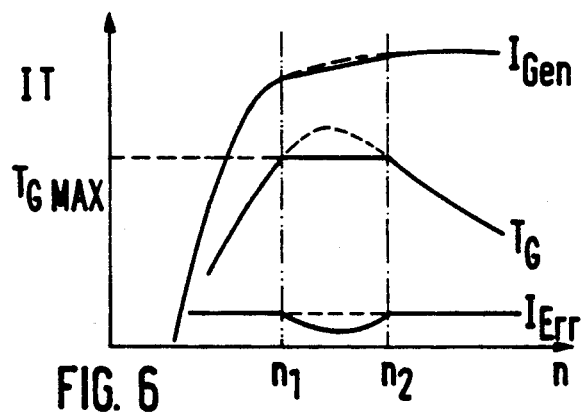
FIG. 6 is a graphical illustration of the relationship between generator temperature, excitation current and rotation speed in a system according to FIG. 5.

The operation of the generator/voltage regulator arrangement according to FIG. 5 can be explained with the help of the graphical illustration in FIG. 6:

In FIG. 6 the dependence of the generator current, $I_{Gen}$, the exciting current, $I_{Err}$, and the temperature $T_B$ on the generator rotation speed n is illustrated. At a higher surrounding temperature in a rotation speed range from $n_1$ to $n_2$ the temperature at one other location of the generator/regulator arrangement exceeds the allowed value of $T_{GMAX}$, if no suitable steps are taken. The dashed lines in the FIG. 6 show the associated undesired curves.

In the circuit 44 and/or correspondingly in the microprocessor, stored characteristic parameters, and as necessary additional measured values, e.g. the generator rotation speed n, are used to determine directly measured temperatures at predetermined locations in the generator/voltage regulator are high.

Should these predetermined temperatures exceed one or more different predetermined limiting temperatures, the exciting current flow is reduced by control of the switching transistor 25, so that temperature does not exceed the predetermined limiting value.

Should the temperature drop even further, because either the outside temperature is reduced or the generator rotation speed climbs, the voltage regulator increases the exciting current again to its standard nominal value.

The described measurement of the temperature at the voltage regulator, which is possible without great difficulty and/or without great expense and the temperatures calculated from this measured temperature at other locations in the system according to a socalled observation function, which is a known part of process engineering, are performed.

The solid lines of FIG. 6 show the current and temperature curves, when the exciting current is lowered in accordance with the methods of the invention when the temperature or temperatures are too high.

When the exciting current is reduced, a signal is produced, advantageously by the charge control lamp. The activation of the signal occurs by the voltage regulator 26 and/or the microprocessor 44.

In the generator/charging regulating arrangement according to FIG. 5, the generator structure is designed so that in a case in which the temperature is too high and injury is likely to occur, the cross section of the winding can be smaller than usual, the cooling air is reduced or the form of the cooling elements is simplified, so that material and weight savings are both possible.

The apparatus of FIGS. 2 to 5 are understandably combined with each other, so that a temperature determination for the devices shown in FIGS. 3 and 4 can occur by microprocessor considering the supplied characteristic parameters or measured values. Similarly, with these devices a signal can be generated when the exciting current drops.

It will be understood that each of the elements described above, or two or more together, may also find a useful application in other types of constructions differing from the types described above.

While the invention has been illustrated and described as embodied in an apparatus and method for controlling a generator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In an apparatus for controlling a generator having an exciting winding, a standard load, a standard value of an exciting current in the exciting winding, an output power and an output voltage, said apparatus comprising the exciting winding of the generator, a voltage regulator connected to the exciting winding, said voltage regulator controlling the output voltage of the generator by changing an exciting current in the exciting winding, and means for temperature measurement, the improvement wherein the means for temperature measurement measures a temperature $T_G$ at a predetermined location in the generator and comprising means for determining an allowed limiting temperature $T_{GMAX}$ at the predetermined location in the generator, means for increasing the exciting current in the exciting winding of the generator for a predetermined time interval relative to the standard exciting current to operate the generator at a higher load than the standard load and means for lowering the exciting current, $I_{Err}$, when the temperature $T_G$ determined in the generator by the means for temperature measurement is greater than the allowed limiting temperature $T_{GMAX}$, and where said generator is dimensioned so that, during a higher load than the standard load the temperature in the generator can be higher than the allowed limiting temperature and wherein the means for lowering the exciting current comprises a pulse duration modulation stage (14) connected to a final regulating stage of the voltage regulator to supply an output signal to the voltage regulator to set an input/output ratio of the final regulating stage (17) of the voltage regulator, and wherein said pulse duration modulation stage (14) includes a comparator (15) and an oscillator (16) connected to the comparator, means for measuring a rotation speed of the generator and means for forming a combined signal from a temperature signal generated by the means for temperature measurement, a rotation speed signal generated by the means for measuring the rotation speed and an input/output ratio of the voltage regulator; said means for forming a combined signal being connected to the pulse duration modulation stage (14) to feed the combined signal to the pulse duration modulation stage (14) as an input signal.

2. The improvement defined in claim 1, wherein said pulse duration modulation stage (14) is structured to supply the output signal only when the combined signal is greater than a certain predetermined threshold value of said comparator (15).

3. In an apparatus for controlling a generator having an exciting winding, a standard load, a standard value of an exciting current in the exciting winding, an output power and an output voltage, said apparatus comprising the exciting winding of the generator, a voltage regulator connected to the exciting winding, said voltage regulator controlling the output voltage of the generator by changing the exciting current in the exciting winding, and means for temperature measurement, the improvement wherein the means for temperature measurement measures a temperature $T_G$ at a predetermined location in the generator, and comprising means for determining an allowed limiting temperature $T_{GMAX}$ at the predetermined location in the generator, means for increasing the exciting current in the exciting winding of the generator for a predetermined time interval relative to the standard value of the exciting current to operate the generator at a higher load than the standard load and means for lowering the exciting current, $I_{Err}$, when the temperature $T_G$ determined in the generator by the means for temperature measurement is greater than the allowed limiting temperature $T_{GMAX}$, and where said generator is dimensioned so that, during a higher load than the standard load the temperature in the generator can be higher than the allowed limiting temperature.

4. The improvement as defined in claim 2, wherein the exciting winding has a resistance and the resistance of the exciting winding has a value which can cause thermal overload of the generator.

5. The improvement as defined in claim 3, further comprising means for applying a voltage to the exciting winding, said means for applying the voltage to the exciting winding being structured so that the voltage applied to the exciting winding is increased relative to the output voltage of the generator so that the output power of the generator is increased.

6. The improvement as defined in claim 3, further comprising a power supply and means for operating the generator at a free-running voltage for producing a value of the output voltage which is increased relative to a power supply voltage of the power supply.

7. The improvement as defined in claim 5, wherein the means for applying the voltage to the exciting winding includes one of a voltage converter and a transformer (34).

8. The improvement as defined in claim 5, wherein the means for applying the voltage to the exciting winding only applies the voltage during a predetermined time interval.

9. The improvement as defined in claim 3, further comprising an indicating device, said indicating device being structured and connected to the exciting winding to produce an indicating signal when the exciting current in the exciting winding is lowered.

10. The improvement as defined in claim 3, further comprising an indicating device, said indicating device being structured to produce an indicating signal when the temperature $T_G$ in the generator reaches the allowed limiting temperature $T_{GMAX}$.

11. The improvement as defined in claim 3, further comprising computer means connected to the exciting winding of the generator and the voltage regulator, the computer means being structured to store and receive at least one input measured variable and a plurality of characteristic parameters of the generator and the voltage regulator and to calculate from the characteristic parameters and the input measured variables the temperature $T_G$ in the generator.

12. The improvement as defined in claim 11, wherein said input measured variables include a rotation speed of the generator and a measured value of a temperature in the voltage regulator.

13. The improvement as defined in claim 11, wherein the means for temperature measurement measures a temperature in the voltage regulator as one of the input measured variables and the computer means calculates said temperature $T_G$ at said predetermined location in the generator.

14. The improvement as defined in claim 11, wherein said computer means includes a microprocessor.

15. The improvement as defined in claim 1, further comprising computer means for determining temperatures, a plurality of characteristic parameters being stored in said computer means and said computer means being structured to receive input measured variables and to perform required calculations.

16. In a method for controlling a generator having an exciting winding, a standard load, a standard exterior temperature and an output voltage, using an apparatus for controlling the generator including the exciting winding of the generator, a voltage regulator, said voltage regulator controlling the output voltage of the generator by influencing an exciting current in the exciting winding, and means for temperature determination, the improvement comprising the steps of determining an allowed limiting temperature $T_G$ at a predetermined location during one of a higher load than the standard load, a higher exterior temperature than the standard exterior temperature and both the higher load and the higher exterior temperature, and lowering the exciting current, $I_{Err}$, when a temperature determined by the means for temperature determination is greater than the allowed limiting temperature $T_G$.

17. In an apparatus for controlling a generator having an exciting window, a standard load, a standard value of an exciting current in the exciting winding, an output power and an output voltage, said apparatus comprising the exciting winding of the generator, a voltage regulator connected to the exciting winding, said voltage regulator controlling the output voltage of the generator by setting and adjusting the exciting current in the exciting winding, and means for temperature measurement, the improvement wherein the means for temperature measurement measures a temperature at a predetermined location in the vicinity of the voltage regulator, and comprising means for determining an allowed limiting temperature at the predetermined location, means for increasing the exciting current in the exciting winding of the generator for a predetermined time interval relative to the standard value of the exciting current to operate the generator at a higher load than the standard load and means for lowering the exciting current, $I_{Err}$, when the temperature determined at the predetermined location by the means for temperature measurement is greater than the allowed limiting temperature, and wherein said generator is dimensioned so that, during a higher load than the standard load the temperature in the generator can be higher than the allowed limiting temperature.

18. In a method for controlling a generator having an exciting winding, a standard load, a standard value of an exciting current in the exciting winding, an output power and an output voltage; means for temperature measurement and a voltage regulator connected to the exciting winding, said voltage regulator controlling the output voltage of the generator by setting and adjusting the exciting current in the exciting winding, the method comprising the steps of increasing the exciting current in the exciting winding beyond the standard value of the exciting current to operate the generator at a higher load than the standard load, the improvement comprising the steps of measuring a temperature $T_G$ at a predetermined location in the generator with the means for temperature measurement, determining an allowed limiting temperature $T_{GMAX}$ at the predetermined location in the generator, lowering the exciting current, $I_{Err}$, when the temperature $T_G$ is greater than the allowed limiting temperature $T_{GMAX}$, and wherein the generator is dimensioned so that during the high load the temperature in the generator can be higher than the allowed limiting temperature.

19. In a method for controlling a generator having an exciting winding, a standard load, a standard value of the exciting current in the exciting winding, an output power and an output voltage; means for temperature measurement and a voltage regulator connected to the exciting winding, said voltage regulator controlling the output voltage of the generator by setting and adjusting the exciting current in the exciting winding, the method comprising the steps of increasing the exciting current in the exciting winding beyond the standard value of the exciting current to operate the generator at a higher load than the standard load, the improvement comprising the steps of measuring a temperature at a predetermined location in the vicinity of the voltage regular with the means for temperature measurement, determining an allowed limiting temperature at the predetermined location, lowering the exciting current, $I_{Err}$, when the temperature at the predetermined location is greater than the allowed limiting temperature, and wherein the generator is dimensioned so that during the higher load the temperature in the generator can be higher than the allowed limiting temperature.

* * * * *